Oct. 10, 1944.          S. B. CRARY          2,360,110
ELECTRIC CIRCUIT
Filed Nov. 4, 1942
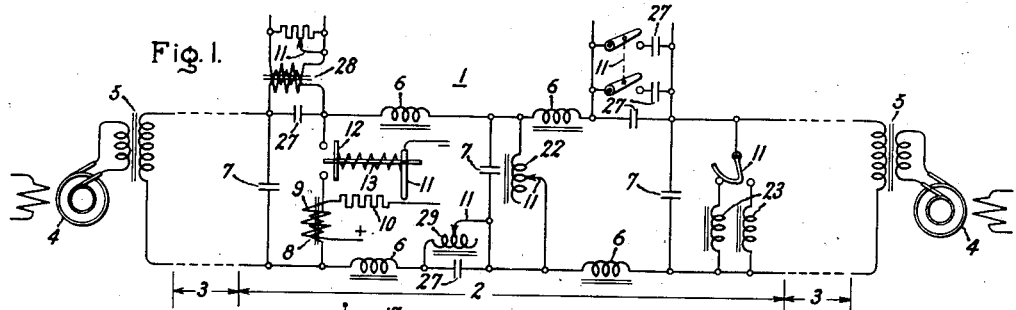
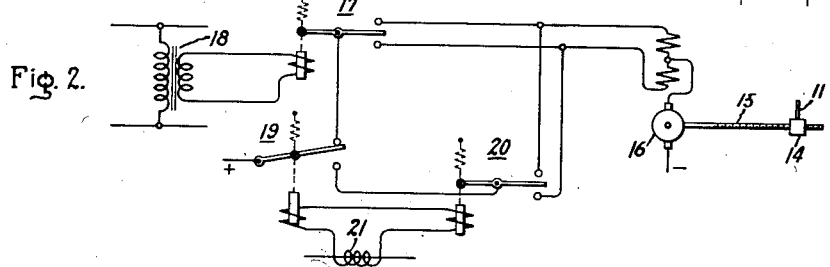
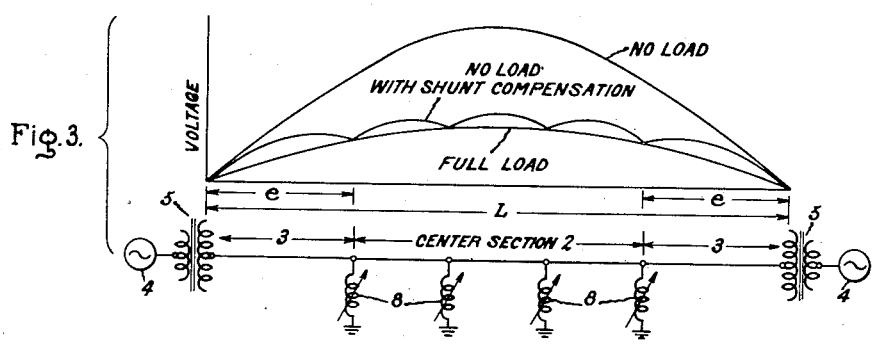
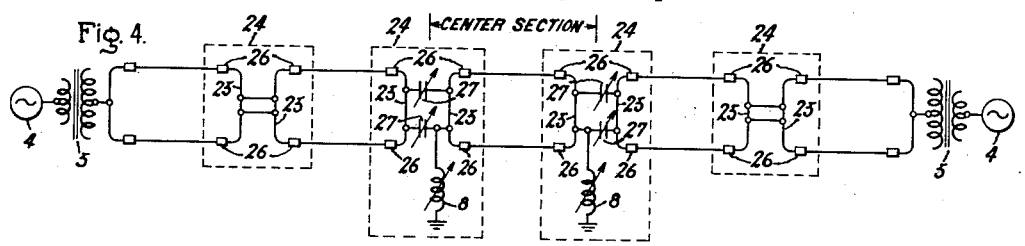
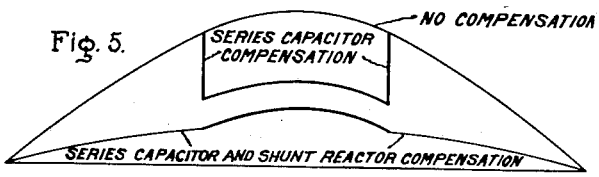
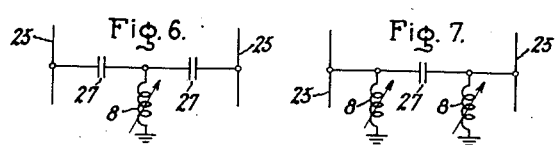
Inventor:
Selden B. Crary,
by Harry E. Dunham
His Attorney.

Patented Oct. 10, 1944

2,360,110

UNITED STATES PATENT OFFICE 2,360,110

ELECTRIC CIRCUIT

Selden B. Crary, Schenectady, N. Y., assignor to General Electric Company, a corporation of New York Application November 4, 1942, Serial No. 464,467

24 Claims. (Cl. 172—237)

This invention relates to electric circuits and more particularly to improvements in long commercial frequency synchronous-to-synchronous power transmission circuits.

By "long" is meant an electrically long line in which line capacitance has an appreciable or significant effect in the design and operating characteristics of the line and which for commercial frequencies of the order of 50 or 60 cycles would be of the order of three hundred miles or greater. Theoretical studies of conventionally-designed long lines indicate certain difficulties with excessive voltage and low stable power limits, or both.

In accordance with this invention these difficulties are reduced or eliminated by the novel use of adjustable reactance means.

An object of the invention is to provide a new and improved control system for long alternating-current power transmission lines.

Another object of the invention is to provide improved adjustable reactance control of long alternating-current power transmission lines.

A further object of the invention is to provide a new and improved electric circuit.

The invention will be better understood from the following description taken in connection with the accompanying drawing and its scope will be pointed out in the appended claims.

In the drawing Fig. 1 illustrates diagrammatically an embodiment of the invention, Fig. 2 is a diagram of an automatic control system for use in connection with the invention, Fig. 3 is a voltage diagram for illustrating the operation of one feature of the invention, Fig. 4 is a single line diagram of a modification of the invention, Fig. 5 is a voltage diagram of the modification shown in Fig. 4, and Figs. 6 and 7 show modified connections of the reactance devices.

Referring now to the drawing and more particularly to Fig. 1, there is shown therein a transmission line 1 having a center section 2 shown in full lines and end sections 3 shown in dashed lines. For simplicity, only one phase has been shown, although it should be understood that in actual practice at least three similar phases would ordinarily be employed. The terminals of the end sections 3 are connected to synchronous dynamo-electric machines 4 through power transformers 5. Although no other terminal equipment has been shown, it should, of course, be understood that in practice all the usual switching and protective equipment and system loads will also be present.

The line has inherent distributed series inductance indicated by the coils 6 and has inherent distributed shunt capacitance indicated by the capacitors 7.

Study of long distance transmission shows that the power transmitting ability of a long line is limited by the voltage that may exist along the line. For lines up to half wave length (about 1500 miles at 60 cycles per second) the maximum voltage along the line appears near the center and is highest at small angular displacements between the sending and receiving end voltages, these small angular displacements corresponding to no-load or light load on the system. For lines above a half wave length the maximum voltage may appear at other points along the line. The voltage along the line is a function of the load conditions and one way of controlling this voltage is to use one or more shunt reactors for compensating for the line charging capacity. The effectiveness of these reactors is greatly increased if the compensation they produce is varied either automatically or manually in accordance with load conditions on the transmission line. This will reduce the required synchronous condenser capacity for power factor control and voltage regulation purposes.

One such reactor is shown at 8 in the drawing as comprising a saturable core device in that it is provided with a direct-current saturating winding 9. The showing of the reactor is schematic and in actual practice it would be advisable to provide it with either a three-legged or four-legged core in accordance with well-known practice. In circuit with the direct-current saturating winding 9 is a rheostat 10 having a movable arm 11. The circuit of the direct-current saturating winding and the rheostat are connected to any suitable source of direct current so that variations in the position of the member 11 will control the inductive reactance of the reactor 8. In this manner any desired portion of the line charging current drawn by the shunt capacitance of the circuit may be neutralized.

The advantages of this scheme are that tap-changing equipment is not required and that the control is smooth and continuous over its entire range of operation. The voltage correcting action can be made fast by keeping the time constant of the direct-current circuit to a low value. In this manner the equipment can be made quicker than conventional tap-changing equipment and this would be a definite advantage in increasing the power limits and reducing the overvoltages and possible line flashovers following sudden load changes. The travel of the rheostat arm 11 can be such that in one extreme position it interrupts the direct-current control circuit in order to obtain minimum reduction in transmission line voltage when the reactor is across the line. Still further reduction may be obtained by means of a switch 12 connected in series with the reactor 8 so that the reactor may be disconnected from the circuit. The opening of this switch will reduce the reactor current to zero and eliminate the reactor losses during load conditions which would not cause abnormally high voltages. As shown, the switch can be automatically controlled by the rheostat 11 so that, for example, when the rheostat arm 11 moves to the right beyond the position which open-circuits the rheostat all the lost motion will be taken up in a mechanical connection 13 whereupon further movement to the right of the lever 13 will open the switch 12. With this arrangement as soon as the arm is moved to the left the reactor is first connected in circuit and then the direct-current control circuit is closed and this current is progressively increased.

While the above description refers particularly to the combination of a shunt saturable reactor and the charging capacitance of a transmission circuit, it will be obvious to those skilled in the art that the shunt capacitance could be in the form of a shunt capacitor. Shunt capacitors are used for power factor control in alternating-current power circuits, but one of their chief disadvantages is the lack of smooth control of the voltage with load changes or with continually oscillating or pulsating load conditions. The use of switches or contactors for automatically connecting and disconnecting shunt capacitors from a line every few seconds or so under such pulsating conditions provides too severe operating conditions to be practical. However, by the use of a smoothly controllable reactor in shunt circuit relation with the shunt capacitor the effective value of the capacitor may be smoothly varied over a wide range.

A preferred way of automatically controlling the reactor 8 is by means of a line voltage responsive regulator circuit. An example of such a circuit is shown in Fig. 2 wherein the movable control arm 11 is shown as being carried by a traveling nut 14 on the threaded shaft 15 of a reversible servomotor 16 whose energization and direction of operation are controlled by a contact making primary voltage sensitive relay 17 energized from a potential transformer 18 whose primary winding is preferably connected across the transmission line so as to measure its voltage. The voltmeter 17 is adjusted to balance at any desired voltage and if the voltage departs from this value the voltmeter will close one or the other of its sets of contacts, thereby to cause the motor 16 to rotate in one direction or the other whereby the member 11 is moved in the proper direction to cause restoration of the voltage to the value at which the relay 17 balances. Under some circumstances the voltage of the transmission circuit may tend to go so high that even with full saturation of the reactor the line voltage will not be held down to the desired value. Under these circumstances the reactor may be injured by carrying too high a current and in order to prevent this, overcurrent protection may be provided in the form of a pair of current relays 19 and 20, both of which are energized from a current transformer 21 which may be connected in series with the reactor 8. Relay 19 is an overcurrent relay which is normally closed in the position shown in the drawing but which will be moved to the opposite circuit closing position when the current through its winding exceeds a predetermined value. The relay 20 is a balancing type regulating relay similar to the relay 17 and which may be adjusted or calibrated so as to balance at any desired value of current. In this manner if the current in the reactor 8 exceeds a predetermined value the relay 19 will be actuated so as to break the control circuit through the contacts of the relay 17 and complete the control circuit through the contacts of the relay 20. Therefore, so long as the overcurrent condition lasts, control is taken away from the voltage relay 17 and given to the current relay 20 whereby the current relay will operate the motor 16 and the movable arm 11 in such a manner as to prevent the reactor current from exceeding the predetermined value for which the relay 20 is adjusted. As soon as main circuit conditions return to near normal the relay 19 will operate to return the control from the current relay 20 to the voltage relay 17.

All of the adjustable shunt inductive reactance may be located at a single installation but I have found that best control is obtained when the shunt inductive compensation is split up among a plurality of spaced installations, so that, for example, if reactor 8 comprises one installation it is best to provide additional installations such as 22 and 23. Installation 22 comprises, by way of example, a multi-tapped reactor in which the reactive value is adjusted by varying the number of effective turns of the reactive winding. This may be done by any suitable tap-changing equipment of the load-ratio-control type. Installation 23 comprises a plurality of reactors 23 with a switch for sequentially connecting them and disconnecting them from across the circuit. Both the tap-changing means and the multi-pole switch must necessarily have a main movable control member which corresponds to the movable control member 11 for the reactor 8 so that all of these main movable control members may be operated by the system shown in Fig. 2; thereby the same system or each reactor installation may be provided with its own automatic control system similar to that shown in Fig. 2.

A three-hundred mile sixty-cycle-per-second line does not have a substantial increase in voltage above its terminal voltages at intermediate points on the line. However, as the length is increased, the voltage of the center of the line rises further and further above the terminal voltage until for a one-half wave length line, which corresponds to about 1500 miles in length, the voltage at the midpoint of the line becomes very much higher than terminal voltage. Even at five or six hundred miles the no-load voltage at the center of the line will be ten to twenty per cent higher than the terminal voltage, although the full-load voltage at this point will not be appreciably above the terminal voltage. Therefore, the longer the line the more important is the use of shunt reactance compensation.

The above location of the shunt reactance compensation is across the center section of the line and the best arrangement is to use substantially equal size reactor installations which are substantially equally spaced in the center section. The combined shunt inductive reactance should be equal to the shunt capacitive reactance of the center section of the line so that, for example, if it is desired to have the over-all shunt inductive reactance compensation equal to half the shunt capacitive reactance of the line, then the center section should be half the length of the line and each of the end sections should be one-fourth the length of the line. Such an arrangement and its accompanying voltage diagram is shown in Fig. 3. The voltage diagram shows the variation in line voltage along the line for the conditions of no load, full load, and no load with shunt reactance compensation. As will be seen, the shunt compensation holds the no-load voltage down to near the full-load voltage, it being equal to the full-load voltage at the particular locations of the reactor installations. By providing automatic control of the reactors, as previously described, the line voltage can be made to stay between the full-load curves and the no-load shunt compensation curve. In this manner the amount of power which can be transmitted over the line is materially greater than the power that could be transmitted if the line voltage at the center of the line were held down by decreasing the terminal voltages.

Another limitation on the power which can be transmitted over a long line is the distributed series inductance of the line. As is well known, this inductance can be compensated for in whole or in part by the use of series capacitors, and the optimum arrangement of the series capacitors is to install them in substantially equal-size groups which are substantially equally spaced in a center section, the length of which is such that the series capacitors provide one-hundred per cent compensation of the center section. For a one-hundred per cent compensated line this would mean that the center section is the entire line and the end sections disappear. One-hundred per cent compensation, however, is impractical as synchronous transmission requires the presence of reactance between the machines at each end of the line. Therefore, in all practical cases the center section will be shorter than the line itself.

It is believed that practically all lines of over 300 miles in length will be multi-circuit lines and a preferred arrangement of series and shunt compensating reactance means for such a multi-circuit line is shown in Fig. 4. This is a single line diagram showing a double circuit line which is provided with a plurality of switching stations 24. Each of these stations contains a pair of sectionalizing buses 25 and four circuit breakers 26 for controlling the connection and disconnection of the various circuit sections to their respective buses. For any direction of power flow through the line one sectionalizing bus will be an incoming bus and the other will be an outgoing bus, the power, of course, flowing from the incoming to the outgoing bus. The buses are interconnected in any suitable manner and the series capacitance compensation is connected between the buses in the switching stations which lie within the center section of the line. As shown, this compensation comprises series capacitors 27. In this manner if there is a fault on any circuit section the circuit breaker 26 at each end of such circuit section can open so as to isolate the fault without reducing the amount of series compensation in the line. The shunt compensating reactors are also connected across the line between the sectionalizing buses in the switching stations which lie within the center section of the line.

Fig. 5 shows the no-load voltages along the line of Fig. 4, the highest voltage curve being the no-load curve when neither series nor shunt compensation is present. The curve showing the two abrupt voltage drops represents conditions when only the series capacitive compensation is present, these two drops being caused by the charging current of the line flowing through the series capacitors. As this charging current is supplied from both ends of the line toward the middle, it produces drops when flowing through both of the capacitors. The lowermost curve shows the voltage when both series capacitor and shunt reactor compensation are present and when the shunt compensation is so proportioned that no charging current flows through the series capacitors. Under these conditions there is, of course, neither a voltage drop nor a voltage rise through the capacitors and as the charging current through the end sections of the line is reduced by the presence of the shunt reactors, the voltage is held down all along the line, there being a slight tendency for it to rise between the shunt reactor installations.

Figs. 6 and 7 show alternative arrangements of the series and shunt compensation between the incoming and outgoing buses of the switching stations.

For certain purposes it is sometimes desirable to vary the amount of series compensation. This may be accomplished in a number of different ways. For example, as shown in Fig. 1, a saturable core reactor 28 may be connected in shunt circuit relation with one of the series capacitors 27. Thus, by controlling the reactance value of this reactor the effective capacitance of the series capacitor may be adjusted. Another way would be to provide a tap-changing reactor 29, and still another way would be to provide a plurality of series capacitors with a multi-position multi-pole switch for sequentially connecting the capacitors in parallel. All of these may be provided with a movable member corresponding to the member 11 of the rheostat 10 and this member may be automatically controlled by the system shown in Fig. 2.

Another advantage of the automatic adjustment of the reactance compensation of the line is that by setting the automatic voltage control means so as to hold the voltage along the line substantially equal to the terminal voltage of the line, surge impedance loading will automatically be maintained throughout a wide range of load variation. Ideally for infinitely distributed shunt and series compensation the effective surge impedance at a given frequency can be written as in Equation 1.

$$Z_S = \sqrt{\frac{Z}{y}} = \sqrt{\frac{r + j(x_L - x_{series})}{a + j(b_c - b_{shunt})}} \qquad (1)$$

where $Z$ = impedance per unit length of line
$y$ = admittance per unit length of line
$r$ = resistance per unit length of line
$x_L$ = inductive reactance per unit length of line
$x_{series}$ = series capacitance compensation per unit length of line
$a$ = leakance per unit length of line
$b_c$ = capacitive susceptance per unit length of line
$b_{shunt}$ = shunt inductive susceptance compensation per unit length of line.

The above equation can be written for the ideal case where $r$ and $a$ are considered to be negligible, as follows:

$$Z_S = \sqrt{\frac{x_L - x_{series}}{b_c - b_{shunt}}} \qquad (2)$$

The surge impedance kilowatt loading for a three-phase transmission line is equal to $$P_S = \frac{E^2_{(line)}}{Z_S} \times 1000 \qquad (3)$$

where $E_{(line)}$ = line-to-line kilovolts. Accordingly, for a constant potential line the surge impedance power can be changed by changing $Z_S$. $Z_S$, as shown by Equation 2, may be decreased and the power transmitted therefore increased for surge impedance conditions by series capacitor compensation. With shunt reactance compensation the surge impedance may be increased and the surge impedance loading therefor decreased. Accordingly, control of the line surge impedance may be obtained by either varying the series compensation or the shunt compensation. The most practical method by which this may be accomplished in a transmission line would be to have sufficient series compensation in order to carry the maximum loading required of the line and then to increase the shunt compensation as the load decreased in order to maintain surge impedance loading conditions. This may be accomplished, therefore, by the use of shunt reactors controlled as a function of voltage in the manner described above. Since the surge impedance loading of the lines results in practically flat voltage except for the resistance drop in the line, it becomes possible to control shunt compensation as a function of the voltage at the point of compensation in order to obtain surge impedance loading conditions. It follows that in order for such a method of transmission to be effective, the compensation should be distributed along the line. The greater the number of points of compensation the more closely will the ideal condition be approached of unity power factor along the line. This will result in reduced losses and essentially flat voltage. Naturally the number of points at which compensation can be applied are limited because of practical limitations.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a long alternating-current power transmission line having constant terminal voltages, lumped static reactance means connected to said line at at least one intermediate place thereon, and means responsive to the voltage of an intermediate point on said line for varying the effective value of said reactance means with variations in power transmitted by said line so as to maintain the voltage of said intermediate point substantially constant thereby substantially to maintain surge impedance loading of said line over an appreciable range of variation of power flow therethrough.

2. The combination as in claim 1 in which said reactance means has resultant series capacitance.

3. The combination as in claim 1 in which said reactance means has resultant shunt inductance.

4. The combination as in claim 1 in which said reactance means has resultant series capacitance and shunt inductance.

5. The combination as in claim 1 in which said reactance means is connected near the center of said line.

6. In combination, a conventionally-proportioned sixty-cycle-per-second power transmission line for interconnecting constant equal voltage synchronous transmitting and receiving stations which are between three hundred and fifteen hundred miles apart, adjustable inductance means connected in shunt with said line in the vicinity of the center thereof, and automatic means responsive to the voltage at the vicinity of the center of said line for adjusting the value of said inductance so as to hold said center voltage at a constant value which is materially above the terminal voltage at both no load and full load.

7. In combination, a conventionally-proportioned sixty-cycle-per-second power transmission line for interconnecting constant equal voltage synchronous transmitting and receiving stations which are between three hundred and fifteen hundred miles apart, series capacitance connected in said line, and adjustable shunt inductance connected across said line.

8. The combination as in claim 7 in which said series capacitance and shunt inductance are inserted near the center of said line.

9. In combination, a conventionally-proportioned sixty-cycle-per-second power transmission line for interconnecting constant equal voltage synchronous transmitting and receiving stations which are between three hundred and fifteen hundred miles apart, series capacitance connected in said line, adjustable shunt inductance connected across said line, and automatic means responsive to a function of the power flow of said line for adjusting said inductance.

10. The combination as in claim 9 in which said automatic means is responsive to line voltage.

11. In combination, a conventionally-proportioned sixty-cycle-per-second power transmission line for interconnecting constant equal voltage stations which are between three hundred and fifteen hundred miles apart, series capacitance connected in said line for increasing its surge impedance loading to the stability limit of the system, and adjustable shunt inductance connected across said line for adjustably reducing its surge impedance loading substantially below said stability limit.

12. In combination, a long alternating-current transmission line having substantial distributed shunt capacitance, said line being divided into a center section and two equal end sections, and a plurality of substantially equal size equally spaced shunt reactor installations connected across said center section, the length of said center section being such that its distributed capacitive reactance substantially equals the effective inductive reactance of said reactors.

13. In combination, a long alternating-current transmission line having substantially distributed shunt capacitance, said line being divided into a center section and two equal end sections, and a plurality of shunt reactor installations connected across said center section, the length of said center section being such that its distributed capacitive reactance substantially equals the effective inductive reactance of said reactors.

14. In combination, a long alternating-current transmission line having substantial distributed series inductance and shunt capacitance, said line comprising a center section and two equal end sections, a plurality of substantially equal size equally spaced series capacitor installations connected in said center section, the combined effective capacitive reactance of said capacitor installations being substantially equal to the distributed inductive reactance of said center section, and a plurality of substantially equal size equally spaced inductive reactor installations connected in shunt circuit relation with said center section, the combined effective reactance of said reactors being substantially equal to the distributed shunt capacitive reactance of said center section.

15. In combination, a long alternating-current transmission line having substantial distributed series inductance and shunt capacitance, said line comprising a center section and two equal end sections, a plurality of series capacitor installations connected in said center section, the combined effective capacitive reactance of said capacitor installations being substantially equal to the distributed inductive reactance of said center section, and a plurality of inductive reactor installations connected in shunt circuit relation with said center section.

16. In combination, a long alternating-current transmission line having substantial distributed series inductance and shunt capacitance, said line comprising a center section and two equal end sections, a plurality of series capacitor installations connected in said center section, and a plurality of inductive reactor installations connected in shunt circuit relation with said center section, the combined effective reactance of said reactors being substantially equal to the distributed shunt capacitive reactance of said center section.

17. In combination, a long alternating-current transmission line having substantial distributed series inductance and shunt capacitance, said line comprising a center section and two equal end sections, a plurality of substantially equal size equally spaced series capacitor installations connected in said center section, the combined effective capacitive reactance of said capacitor installations being substantially equal to the distributed inductive reactance of said center section, and a plurality of inductive reactor installations connected in shunt circuit relation with said center section.

18. In combination, a long alternating-current transmission line having substantial distributed series inductance and shunt capacitance, said line comprising a center section and two equal end sections, a plurality of series capacitor installations connected in said center section, and a plurality of substantially equal size equally spaced inductive reactor installations connected in shunt circuit relation with said center section, the combined effective reactance of said reactors being substantially equal to the distributed shunt capacitive reactance of said center section.

19. In combination, a long multi-circuit per phase alternating current power transmission line, a plurality of intermediate switching stations in said line, each of said stations having an incoming and an outgoing sectionalizing bus per phase, series capacitive means interconnecting the corresponding incoming and outgoing sectionalizing buses in at least one of said switching stations, and shunt inductive means for said circuit connected to said line between the corresponding incoming and outgoing buses of at least one of said switching stations.

20. In combination, a long multi-circuit per phase alternating current power transmission line, a plurality of intermediate switching stations in said line, each of said stations having an incoming and an outgoing sectionalizing bus per phase, means interconnecting the corresponding incoming and outgoing sectionalizing buses in at least one of said switching stations, and shunt inductive means for said circuit connected to said line between the corresponding incoming and outgoing buses of at least one of said switching stations.

21. In combination, a long multi-circuit per phase alternating current power transmission line, a plurality of intermediate switching stations in said line, each of said stations having an incoming and an outgoing sectionalizing bus per phase, series capacitive means interconnecting the corresponding incoming and outgoing sectionalizing buses in the switching station nearest the electrical center of said line, and shunt inductive means for said circuit connected to said line between the corresponding incoming and outgoing buses of said switching station.

22. In combination, a long multi-circuit per phase alternating-current power transmission line, a plurality of intermediate switching stations in said line, each of said stations having an incoming and an outgoing sectionalizing bus per phase, means interconnecting the corresponding incoming and outgoing sectionalizing buses in the switching station nearest the electrical center of said line, and shunt inductive means for said circuit connected to said line between the corresponding incoming and outgoing buses of said switching station.

23. In combination, a long alternating-current power transmission line, reactive means connected to said line, adjustable means for varying the effective reactance value of said reactive means, voltage responsive means for automatically controlling said adjustable means, and current responsive means for modifying the action of said voltage responsive means.

24. In combination, a long alternating-current power transmission line, an adjustable reactance device connected to said line, means responsive to an electrical condition of said line for automatically controlling the value of said device, and means responsive to an electrical condition of said device for modifying the action of said first-mentioned means.

SELDEN B. CRARY.